United States Patent
Mashayekhi et al.

(10) Patent No.: US 7,139,930 B2
(45) Date of Patent: Nov. 21, 2006

(54) FAILOVER SYSTEM AND METHOD FOR CLUSTER ENVIRONMENT

(75) Inventors: Victor Mashayekhi, Round Rock, TX (US); Jenwei Hsieh, Austin, TX (US); Mohamad Reza Rooholamini, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 11/188,429

(22) Filed: Jul. 25, 2005

(65) Prior Publication Data

US 2005/0268156 A1    Dec. 1, 2005

Related U.S. Application Data

(62) Division of application No. 09/927,047, filed on Aug. 9, 2001, now Pat. No. 6,922,791.

(51) Int. Cl.
G06F 11/00 (2006.01)

(52) U.S. Cl. .............................................. 714/4; 714/3
(58) Field of Classification Search ................ 714/3–4
See application file for complete search history.

(56) References Cited

U.S. PATENT DOCUMENTS

| | | | |
|---|---|---|---|
| 5,062,055 A | 10/1991 | Chinnaswamy et al. | |
| 5,459,864 A | 10/1995 | Brent et al. | |
| 5,612,865 A | 3/1997 | Dasgupta | |
| 5,696,895 A | 12/1997 | Hemphill et al. | |
| 5,781,716 A | 7/1998 | Hemphill et al. | |
| 5,784,697 A | 7/1998 | Funk et al. | |
| 5,852,724 A | 12/1998 | Glenn, II et al. | |
| 5,915,095 A | 6/1999 | Miskowiec | |
| 5,938,732 A | 8/1999 | Lim et al. | |
| 6,067,412 A | 5/2000 | Blake et al. | |
| 6,067,545 A | 5/2000 | Wolff | |
| 6,078,957 A | 6/2000 | Adelman et al. | |
| 6,078,960 A | 6/2000 | Ballard | |
| 6,115,830 A | 9/2000 | Zabarsky et al. | |
| 6,119,143 A | 9/2000 | Dias et al. | |
| 6,138,159 A | 10/2000 | Phaal | |
| 6,145,089 A | 11/2000 | Le et al. | |
| 6,202,080 B1 * | 3/2001 | Lu et al. ..................... | 718/105 |
| 6,202,149 B1 * | 3/2001 | Hedegard ................... | 713/100 |
| 6,578,064 B1 * | 6/2003 | Saito et al. ................. | 718/103 |
| 6,594,784 B1 * | 7/2003 | Harper et al. ................ | 714/47 |
| 6,609,213 B1 | 8/2003 | Nguyen et al. | |
| 6,622,259 B1 * | 9/2003 | Schmuck ...................... | 714/4 |
| 6,842,867 B1 | 1/2005 | Cooper | |

(Continued)

FOREIGN PATENT DOCUMENTS

EP    1 024 428 A2    8/2000

*Primary Examiner*—Scott Baderman
*Assistant Examiner*—Timothy M. Bonura
(74) *Attorney, Agent, or Firm*—Baker Botts L.L.P.

(57) ABSTRACT

A failover method and system is provided for a computer system having at least three nodes operating as a cluster. One method includes the steps of detecting failure of one node, determining the weight of at least two surviving nodes, and assigning a failover node based on the determined weights of the surviving nodes. Another method includes the steps detecting failure of one node and determining the time of failure, and assigning a failover node based in part on the determined time of failure. This method may also include the steps of determining a time period during which nodes in the cluster are heavily utilized, and assigning a failover node that is not heavily utilized during that time period.

5 Claims, 5 Drawing Sheets

U.S. PATENT DOCUMENTS

| | | |
|---|---|---|
| 6,941,341 B1 | 9/2005 | Logston et al. |
| 6,944,788 B1 * | 9/2005 | Dinker et al. .................. 714/4 |
| 6,986,076 B1 * | 1/2006 | Smith et al. ................... 714/4 |
| 7,055,053 B1 * | 5/2006 | Saika ............................ 714/4 |
| 2003/0051187 A1 * | 3/2003 | Mashayekhi et al. .......... 714/4 |
| 2004/0205767 A1 * | 10/2004 | Partanen ..................... 719/312 |
| 2004/0236860 A1 * | 11/2004 | Logston et al. ............. 709/230 |
| 2005/0010567 A1 * | 1/2005 | Barth et al. .................... 707/3 |
| 2005/0268156 A1 * | 12/2005 | Mashayekhi et al. .......... 714/4 |

* cited by examiner

FAILOVER SYSTEM AND METHOD FOR CLUSTER ENVIRONMENT

CROSS-REFERENCE TO RELATED APPLICATIONS

This application is a division of application Ser. No. 09/927,047, filed Aug. 9, 2001, now U.S. Pat. No. 6,922,791 which is incorporated herein by reference.

TECHNICAL FIELD

The present disclosure relates generally to the field of computers, and more particularly, to a system and method for implementing failover policies in a cluster environment.

BACKGROUND

Clustering is a well known concept that refers to a group of individual computer systems, or nodes, operating together as if it were a single system or single computing resource. One characteristic of a cluster is its scalability, or the ability to add (or delete) nodes from the cluster to meet the user's performance requirements. Another characteristic of a cluster is high availability (HA). High availability refers to the ability of a server to remain operational, or available to a user, even when one or more nodes in the cluster fail. High availability can be improved in a cluster by implementing "failover" procedures that enable the operations performed on a node to failover to, or be assumed by, another node in the cluster in the event that that node fails. Failover procedures must include a policy for selecting the node(s) to assume the tasks or applications running on the failed node. Some failover policies improve the high availability of a cluster system more than others. Thus, the implementation of a failover policy can be crucial when considering the overall high availability of a cluster.

Establishing a failover policy is a simple task when the cluster consists of only two nodes. When one node fails, the only possible solution is to failover all applications running on the failed node to the surviving node. When there are more than two nodes in the cluster, and multiple applications running on each node, however, the failover possibilities become numerous. For example, theoretically all applications running on the failed node can failover to any one of the remaining nodes, and similarly any of the several applications running on the failed node can failover to any one of the surviving nodes. It is apparent that as the number of nodes and number of applications running on each node increase, the failover possibilities increase dramatically. Establishing concrete failover policies is critical for any cluster environment, as the high availability of the cluster will depend on it.

Many cluster systems operating on Windows NT based servers utilize Microsoft Cluster Services (MSCS) software to provide high availability for the cluster. In the Advanced Server product, MSCS provides fail-over capability for a two-node system. All applications running on the first node failover to the second node, and vice versa. This is considered to be the trivial case. In the DataCenter Server product, MSCS provides fail-over capability for up to a four-node system. MSCS multi-node fail-over is slightly more complex, but is encompassed within the prior art that is described more fully below.

Some known failover policies do exist that address failover in multiple node systems. One method, commonly referred to as cascading, establishes a circular list for all nodes in the cluster. For example, if there are four nodes (nodes 1–4) in the cluster, failure of node 1 will cause all applications running on node 1 to failover to node 2, failure of node 2 will cause all applications running on node 2 to failover to node 3, failure of node 3 will cause all applications running on node 3 to failover to node 4, and failure of node 4 will cause all applications running on node 4 to failover to node 1. The cascading failover policy can be represented graphically by the following illustration, where the direction of the arrow points to the node that will assume responsibility for all applications running on the failed node.

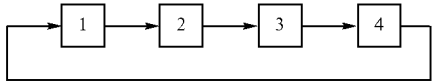

In the above failover policy, each node in the cluster may failover only to one single node that has been designated prior to the time of failure. Further, all applications running on any failed node must failover to the same designated surviving node.

Another known failover policy enables applications running on any given node to failover to any remaining node in the cluster, as is depicted by the following graph.

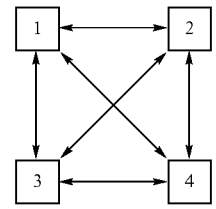

Although the applications of a failed node may theoretically failover to any surviving node, a single failover path must be chosen by a system administrator or the like when the cluster is established or at another time well in advance of the time of failure. Thus, although the possibility exists to select any node for failover purposes, the selection must take place in advance, and there is no way to dynamically assess the best suited node at the time the failure occurs.

Disadvantages of the above-described failover policies are many. First, for any given node, a failover node must be designated in advance. The obvious disadvantages of this are that either failover nodes are designated with complete disregard to the resources needed by the failed node and those available at the failover node (as in the cascading failover policy), or must be determined in a manner that cannot take into account changes in system resources that have occurred since the failover designations were made. For example, additional applications may be added to nodes, or user demands for any given application may increase over time, or even at any given time over the course of any given day. Further, in each of the failover policies described above all applications running on a failed node failover to another single node. This may impact the high availability of the system if the resources of a failover node at the particular time needed are such that it cannot handle all applications, but could otherwise provide failover for certain ones of those applications.

Another known failover policy utilizes a separate "passive" node that is present in the cluster exclusively for the purpose of being the failover node for all active nodes in the cluster. As illustrated in the following graph, each node on the cluster that is actively running applications (nodes 1–3) fails over to node 4, which is not tasked with running any applications other than in the event of a failover.

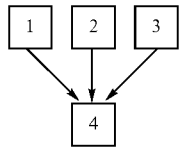

The disadvantages described above also are present in this failover policy. A further disadvantage is that this failover policy designates only a single failover node for each node running applications in the cluster, and requires the presence of an otherwise idle node, which is an inefficient use of system resources.

It is apparent from the above discussion of known failover policies in a cluster environment that there presently is no known way to dynamically choose among several possible failover nodes at the time failure actually occurs. Thus, none of these known policies enable the system to select a failover node that necessarily will have adequate, or the most available, resources at the time the failure occurs. Further, there is no known method by which the applications running on a failed node may be allocated to different ones of surviving nodes. A failover policy having one or more of the above features would be advantageous in that it would enable optimization in failover designations. Evaluation at the time of failure of the resources available on each surviving node, and directing failover to nodes that are most capable of handing one or more of the applications of the failed node, would enable more efficient use of cluster resources, and improve high availability of the cluster.

SUMMARY

Therefore, a need has arisen for failover policies for a cluster environment having more than two nodes in which the applications running on a failed node may be dynamically allocated to one of a several possible surviving nodes. Further, a need has arisen for such a failover policy wherein applications running on the failed node may failover to more than one of the several possible surviving nodes.

In accordance with the present disclosure, a failover method is provided for a computer system having at least three nodes operating as a cluster. The method includes the steps of, following failure of one of the nodes, determining the weight of at least two surviving nodes, determining which of the at least two surviving nodes has the lowest weight, and assigning applications running on the failed node to the surviving node having the lowest determined weight. According to one embodiment, in the weight determining step, the weight of every one of the surviving nodes is determined, and according to yet another embodiment, the weight is determined by evaluating available resources of the node. In yet another embodiment, the evaluating step further includes the steps of examining at least one performance indicator associated with the node, and using a predetermined method to determine from the at least one performance indicator the weight of the node. According to alternate embodiments, the performance indicator is an indicator of current CPU utilization of that node, an indicator of memory currently being used by that node, or both.

A failover method is also provided for a computer system having at least three nodes operating as a cluster, wherein the method includes the steps of determining the amount of resources needed by applications running on one of the nodes, and following failure of the one node, for each of surviving nodes n=1 to N until a failover node is assigned, determining the weight of surviving node n, determining from the weight of surviving node n whether surviving node n has available resources greater than that determined to be needed by the failed node, and if the surviving node n is determined to have sufficient available resources, then assigning node n as the failover node and failing over the applications running on the failed node to the failover node, or if the surviving node n is determined not to have sufficient available resources, then n=n+1. In one embodiment, the determining resources step further includes the step of determining the resources needed by each application running on the one node, and the method further includes the step of prioritizing the applications running on the node, and assigning a failover node for each prioritized application successively starting with the application having the highest priority.

Also provided is a failover method for a computer system having at least three nodes operating as a cluster, wherein the method includes the steps of determining the weight of each of the at least three nodes, ordering the at least three nodes according to their respective increasing weights from lowest to highest, creating a queue containing the ordered nodes, wherein the first node in the queue has the lowest weight, and following failure of one of the at least three nodes, assigning the first surviving node in the queue as a failover node, and failing over applications running on the failed node to the failover node.

Yet another failover method is disclosed for a computer system having at least three nodes operating as a cluster, wherein the method includes the steps of, following failure of one of the at least three nodes, determining the order in which surviving nodes joined the cluster, assigning a failover node according to the order in which the surviving nodes joined the cluster, and failing over all applications running on the failed node to the failover node. According to one embodiment, the failover method further includes the steps of determining the first surviving node to join the cluster, and assigning the first joined surviving node as the failover node. According to an alternate embodiment, the failover method further includes the steps of determining the last surviving node to join the cluster, and assigning the last joined surviving node as the failover node.

A failover method is also provided for a computer system having at least three nodes operating as a cluster, wherein the method includes the steps of detecting failure of one of the at least three nodes, determining a time of failure of the one node, assigning a failover node depending in part on the determined time, and assigning applications running on the failed node to the failover node. According to one embodiment, the method further includes the steps of, for at least one node in the cluster, determining a time period during which the node is heavily utilized, and preventing the at least one node from being assigned as a failover node during the determined time period. According to yet another embodiment, the method further includes the steps of, for at least the failed node, determining in advance of failure a time during which at least one application running on the failed node is heavily utilized, and following failure of the node, if failure occurs during the determined time during which the at least one application is heavily utilized, then assigning a failover node for the at least one application first.

Also provided is a cluster computer system including at least three nodes, wherein the at least three nodes are computer systems operating as a cluster. The cluster computer system is capable of implementing a failover policy in which, following failure of one of the at least three nodes, the weight of surviving possible failover nodes is determined, and a failover node is selected based on the determined weights. According to one embodiment, the cluster computer system is further capable of determining the weights by examining performance indicators of the surviving possible failover nodes. According to yet another embodiment, the weight of the node is determined by using a predetermined mathematical formula including values of the performance indicators, and the performance indicators include at least an indicator of current CPU utilization of that node and an indicator of the amount of memory currently being used by that node.

A cluster computer system is also provided having at least three nodes, wherein the at least three nodes are computer systems operating as a cluster. The cluster computer system is capable of determining a time of failover of one of the at least three nodes, and implementing a failover policy in which, following failover of the one node, a failover node is selected based in part on the determined time. According to one embodiment, the cluster computer system is further capable of determining a time period during which at least one of the nodes is heavily utilized, and preventing the at least one node from being assigned as a failover node during the determined time period. According to yet another embodiment, the cluster is further capable of determining a time during which at least one application on the one failed node is heavily utilized, and upon failure of the one node, if failure occurs during the determined time, then failing over the at least one application first.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION

Preferred embodiments of the present invention are illustrated in the Figures, like numeral being used to refer to like and corresponding parts of the various drawings.

The present disclosure introduces many possible failover policies that may be implemented in a cluster environment having more than two nodes to better utilize available resources of surviving nodes, and thereby, to provide improved high system availability of the cluster. It further introduces the ability to assess system resources at the time a node failure occurs, and also the ability to implement different failover policies for different nodes, or different applications on a node, within the same cluster environment.

Figure 1:
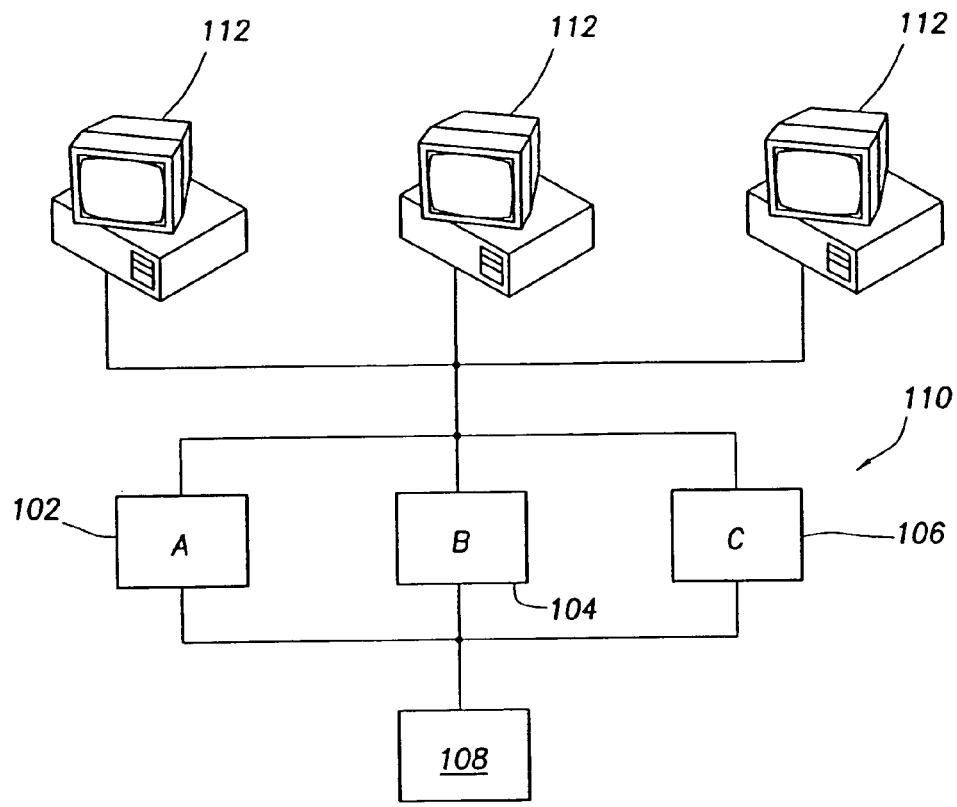
FIG. 1 illustrates generally computer systems operating in a cluster environment.

FIG. 1 illustrates a representative architecture for multiple systems operating as a cluster in which the failover policies described below may be implemented. Servers A (102), B (104) and C (106) operate simultaneously, are interconnected, and each are capable of accessing a centralized storage system 108 via any suitable interface such as a fiber channel interface. Each of servers A, B and C are separate nodes that together form the cluster 110. The processing power of each server in the cluster is accessible by multiple user terminals 112 that may be interconnected by a local area network (LAN), a wide area network (WAN) or any other suitable means. It is to be understood that FIG. 1 represents only one simplified illustration of a cluster. Nodes 102, 104 and 106 have been described as servers, but nodes in a cluster may also be individual personal computers, workstations, or larger entities such as mainframes.

Figure 2A:
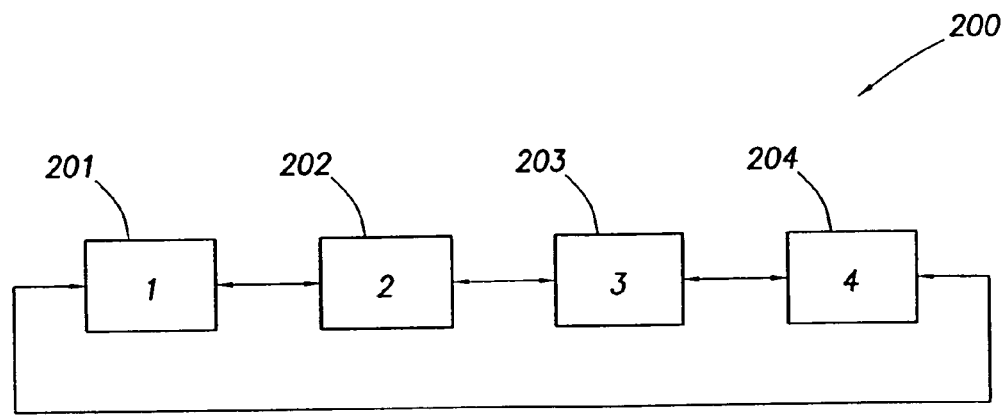
FIG. 2a graphically illustrates a first failover policy according to the present disclosure.
Figure 2B:
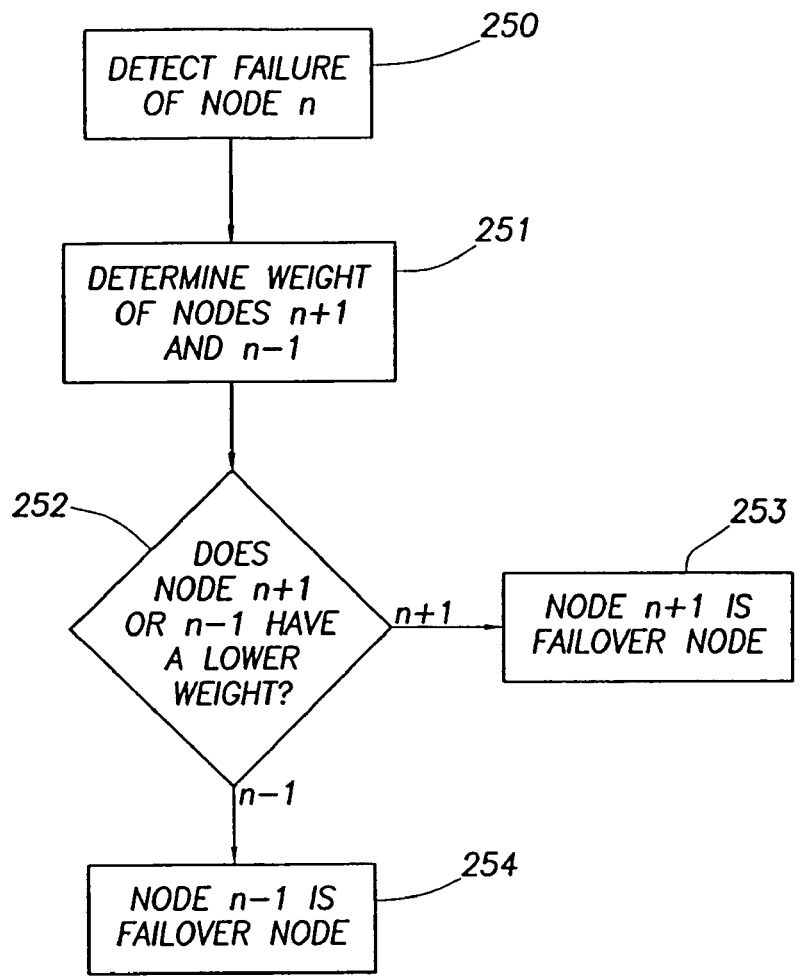
FIG. 2b is a flow chart illustrating a first failover policy according to the present disclosure.

FIGS. 2a and 2b illustrate a first failover policy according to the present disclosure in a cluster environment having N nodes, where N is greater than two. As shown in FIG. 2a, cluster 200 includes four nodes, node 1 (201), node 2 (202), node 3 (203) and node 4 (204). As illustrated by the bi-directional arrows, each node is capable of failing over to either the successive node or the previous node. In other words, each node n, may fail over to node n+1 or node n−1, where node n+1 for the last node (node 4) refers to node 1, and where node n−1 for the first node (node 1) refers to the last node (node 4). Whether node n will failover to node n+1 or node n−1 will be determined by assessing the available resources of both possible failover nodes at the time of failure of node n, as is described more fully below.

The available resources of a node generally refers to the extent to which that node is capable of running additional applications. According to the present disclosure, one method for determining the available resources is to assess the "weight" of each possible failover node by examining its system performance indicators. Most operating systems have performance monitors or indicators that track the usage of system entities, such as memory, disk, network, and processor, amongst others. For example, using these indicators one can collect and view real-time data about memory, or generate logs to accommodate trouble-shooting or subsequent recovery in case of a problem (such as in the event of a memory leak). Alerts can be set to notify an administrator if a performance indicator reaches or surpasses a user-settable threshold. The performance data for a system is available to an application using an Application Programming Interface (API). Using the APIs, an application can observe and track its use of system entities and perform operations based on the value of the performance counters during its operation. These performance indicators can be accessed and used to assess possible failover nodes. For example, in a cluster, should the memory usage of applications running on a node be above 75% of that node's physical memory, it can be designated as not a suitable failover site for a failed node. A node that is showing only 25% memory usage, however, can be designated as a suitable failover site. The "weight" of a node may be determined by creating a mathematical expression based on evaluation of any number of selected performance indicators. For example, if CPU utilization and memory usage are selected performance indicators, and CPU utilization is considered more important, one could assign a weight of 0.9 to CPU utilization and 0.6 to memory usage. The overall weight of the node would be (0.9)*(value of the CPU utilization performance indicator)+(0.6)*(value of the memory usage performance indicator). The node having the lowest weight represents the node having the most available resources. In this manner, the possible failover node having the lowest weight is selected as the desired failover node.

Thus, as shown in FIG. 2b, it is first determined in step 250 that node n has failed. This can be done using "heartbeat" monitoring techniques that are well known in the art. Heartbeating is commonly achieved by exchanging messages over the network (such as TCP/IP messages) with the other members of a cluster. Other techniques include heartbeating over the serial line, over the storage interconnect, or over a private network.

After failure of node n is detected, at step 251 the weight of nodes n+1 and n−1 are determined using one or more predetermined performance indicators and a predefined equation as described above. Once the weight of each node is ascertained, a determination is then made at step 252 as to whether node n+1 or node n−1 has the lowest weight. If node n+1 has the lowest weight, that node is established as the failover node (step 253), but if node n−1 has the lowest weight, node n−1 is established as the failover node (step 254). Thus, a more intelligent failover node can be chosen, thereby improving the high availability of the cluster system.

Figure 3:
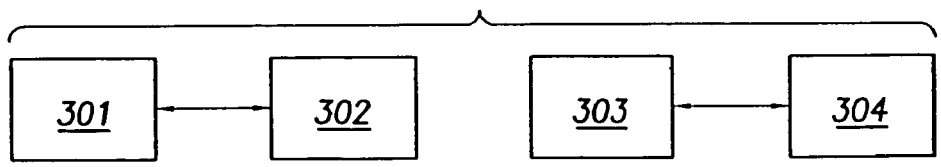
FIG. 3 graphically illustrates another failover policy according to the present disclosure.

Another possible failover policy according to the present disclosure can be implemented in cluster environments having an even number of nodes. As shown in FIG. 3, cluster 301 includes four nodes 301, 302, 303, 304 which are arranged as two pairs of two nodes. Thus, for each pair in the cluster, failure of one node will failover to the other node in the pair.

Yet another failover policy can be implemented in a cluster environment in which any single node may failover to any surviving node. Any type of hash function that randomly selects a failover node from the available nodes can be used in this type of system.

Figure 4:
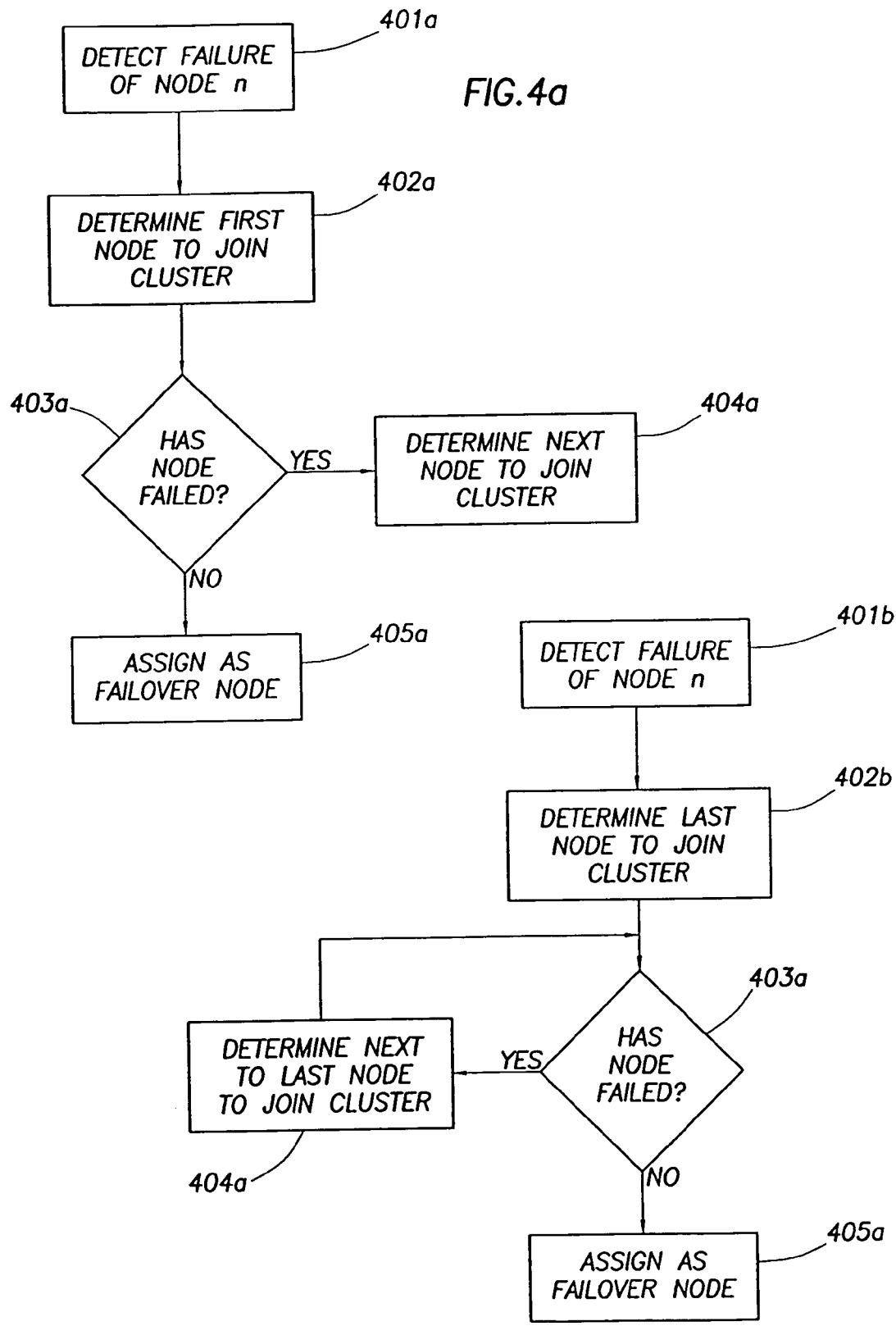
FIG. 4a is a flow chart illustrating yet another failover policy according to the present disclosure.
FIG. 4b is a flow chart illustrating yet another failover policy according to the present disclosure.

Other failover policies according to the present disclosure include First-in-First-out (FIFO) or Last-in-First-out (LIFO) policies, wherein a failover node is designated according to the order in which nodes joined the cluster. For example, according to a FIFO policy, if the order of joining the cluster is node 1, node 2, node 3, then node 4, then the first node to join the cluster (node 1) will be the failover node for all nodes. If node I itself is down (or is the one to fail first), then the next surviving node that was the first to join the cluster will become the failover node. In a LIFO failover policy, the designated failover node is the last one to join the cluster. In the above example, this is node 4, and if node 4 has failed it would become node 3, etc. The FIFO and LIFO policies are illustrated in FIGS. 4a and 4b respectively. First, the failure of node n is detected (steps 401a, 401b). Subsequently, in the FIFO policy, the first surviving node to join the cluster is determined at step 402a, whereas in the LIFO policy the last surviving node to join the cluster is determined at step 402b. In both cases it is then determined whether that node has failed, or is still operational (step 403a, 403b). If that node has not failed, applications running on the failed node failover to that node (step 405a, 405b). If it has failed, the next node (FIFO) or next to last node (LIFO) to have joined the cluster is determined (steps 404a, 404b), and so on until a surviving node is found to failover to.

Figure 5:
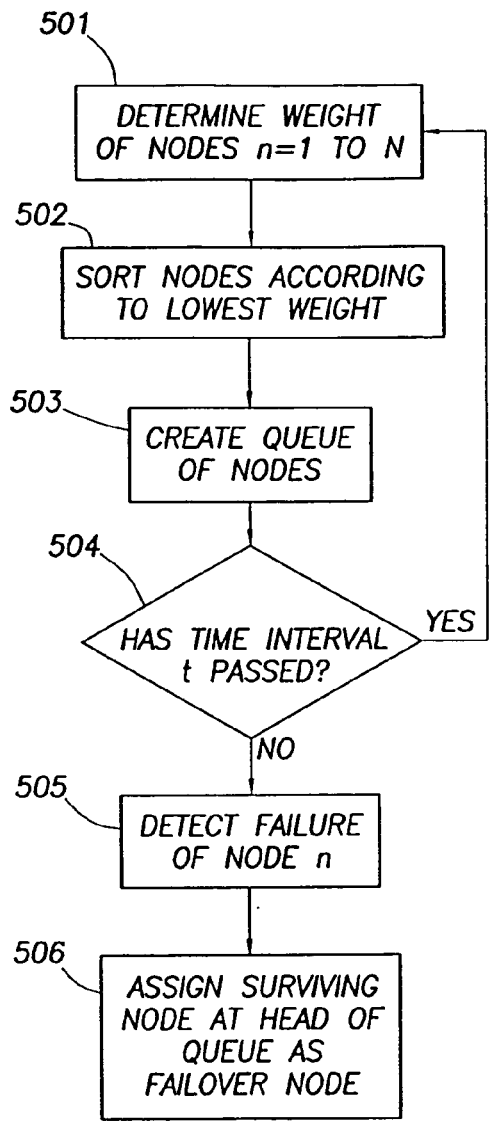
FIG. 5 is a flow chart illustrating another failover policy according to the present disclosure.

Yet another failover policy according to the present disclosure involves maintaining a prioritized queue of failover nodes. The prioritized queue is created by determining the weight of each node in the cluster (FIG. 5, step 501), and then sorting the nodes based on their weights (step 502) and creating a queue consisting of these sorted nodes starting with the node having the least weight at the head of the queue step in step 503. The list may be dynamically re-created at predetermined time intervals to ensure that the prioritization remains current (step 504). When a node in the cluster fails (step 505), the failover node is selected by assigning the applications running on the failed node to the first surviving node in the queue at step 506.

Figure 6A:
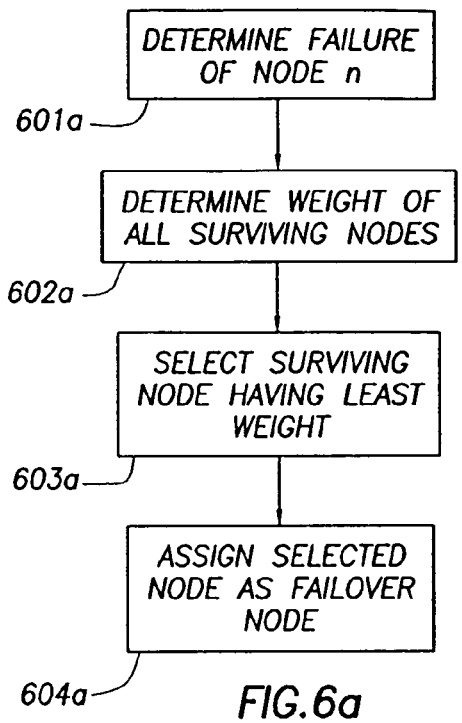
FIG. 6a is a flow chart illustrating yet another failover policy according to the present disclosure.
Figure 6B:
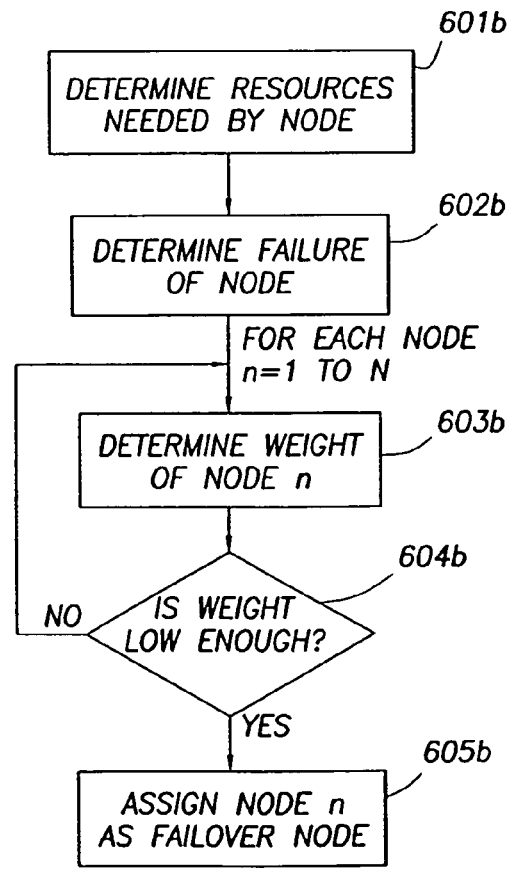
FIG. 6b is a flow chart illustrating another failover policy according to the present disclosure.

Other failover policies that can be established according to the present disclosure are Best Fit or First Fit policies, which are illustrated by FIGS. 6a and 6b respectively. In a Best Fit policy, once failure of a node has been determined (step 601a), the weight of all surviving nodes is assessed at the time (step 602a), and the one having the least weight is selected (step 603a) and assigned as the failover node (step 604a). In a First Fit policy, the resources needed by the applications running on the failed node is determined in advance (step 601b). Although this may be done at the time a cluster is set up, or at the time a node is added to the cluster, it may also be done dynamically at predetermined time intervals. Subsequently, when a node is determined to have failed (step 602b), for each node n=1 to N, the weight of node n is first determined (step 603b). It is then determined whether the weight is sufficiently low to indicate that the node has sufficient available resources to satisfy the resources needed by the failed node (step 604b), as was determined at step 601a. If so, then that node is assigned as the failover node (step 605b). If not, then next node is examined, and so on until a suitable failover node is found.

Another failover policy that can be implemented involves determining in advance which node should serve as a failover node for which other nodes. This selection can be made based on the knowledge of what applications are designated to run on which nodes, and what resources each application requires. For example, a system administrator may set up the cluster such that node 1 and node 4 are file servers, and that both should be designated to failover to node 2. The system administrator may also designate more than one possible failover node, with the choice being made at the time of failure by assessing the weights of the designated nodes.

Yet another possible failover policy for multiple nodes in a cluster involves placing the nodes into subgroups, where a failed node is designated to failover to another node within the same subgroup. For example, if there are eight nodes in the cluster, the eight nodes may be broken down into two groups of four nodes each, or three groups of two nodes each. Each node within the group may be designated to failover to a single node within that group only, or to any other node within that group with the designation being made based on the weight of the other nodes within the group at the time of failure as described above.

Figure 7:
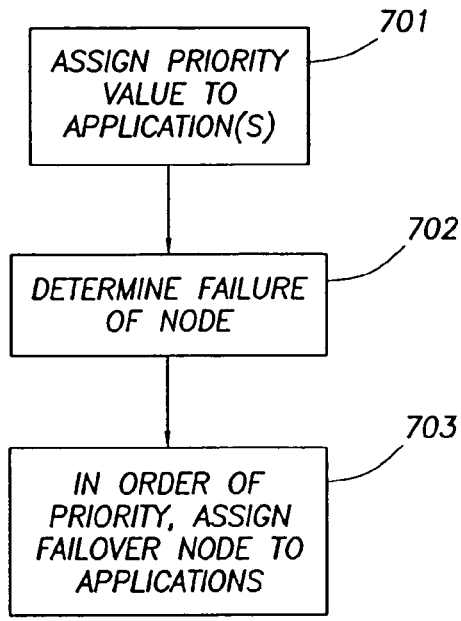
FIG. 7 is a flow chart illustrating yet another failover policy according to the present disclosure.

Yet another failover policy according to the present disclosure assigns failover sites for different applications running on the failed node based on priority. Under this scheme, a priority value is assigned in advance to at least selected applications running on the node (see step 701 in FIG. 7). At the time failure is determined (step 702), the application having the highest priority is determined, and failed over first, followed by the one having the second highest priority, and so on (step 703). Applications without a priority value, if any, can be assigned afterwards. This failover policy helps to ensure that those applications that are most important continue to function in the event of a failure, since any limitations on system resources of the failed node will effect these applications last. This scheme can be combined with any other failover policy described in this disclosure to determine which node each application should fail over to.

Finally, a time-based failover scheme can be implemented in any cluster environment. In a time-based scheme, the failover node to which an application is transferred may depend on the time of day the failure occurs. For example, if a system administrator recognizes that a specific node that services email applications is heavily used in the first hours of the business day, applications on a failed note that occur during those hours would not be failed over to that specific node. This helps to minimize further system interruptions or failures, and helps to ensure that the significant uses of a given system at any given time are not interrupted. Further, should the node that services email applications fail during these critical hours, these applications should failover to another node immediately, and other less important applications running on the failover node can be temporarily suspended.

Figure 8:
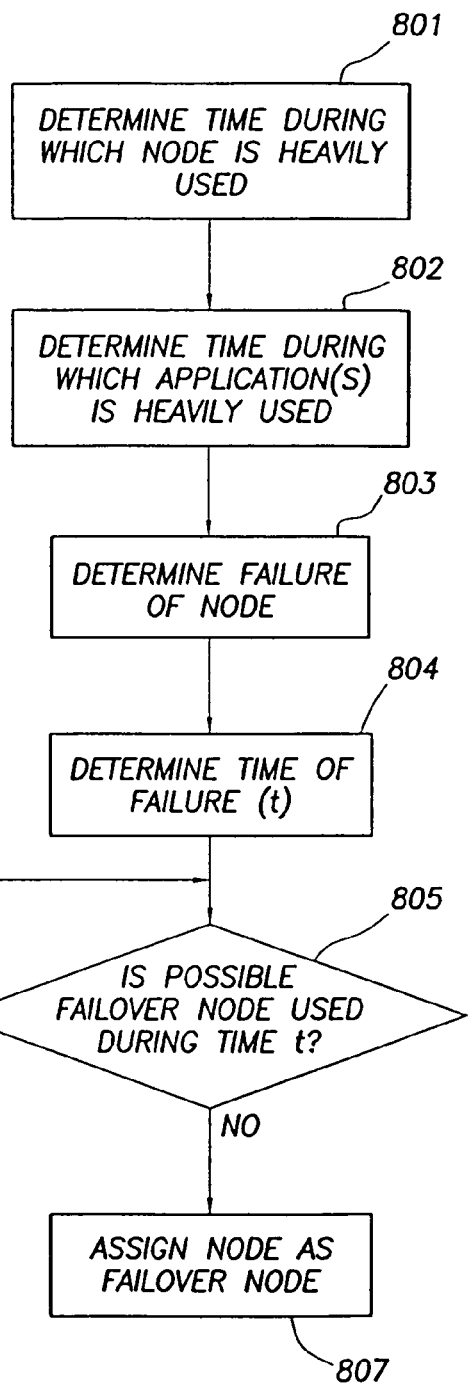
FIG. 8 is a flow chart illustrating yet another failover policy according to the present disclosure.

A time-based failover policy is illustrated generally in FIG. 8. At step 801, prior to the time of failure, the time(s) of day during which one or more nodes in the cluster are most heavily used is determined. According to one embodiment, it may also be determined at this time whether particular applications on the node are most heavily used during particular time(s) of the day (step 802). At step 803, failure of a node is determined, and at step 804 the time of failure is determined. Subsequently, possible surviving failover nodes are examined, and those that are designated as being heavily used during that particular time are removed as possible failover nodes, as shown in steps 805 and 806. When a possible failover node is found that is not excluded, it is assigned as the failover node (step 807). This may be done in several different ways, and in conjunction with implementing different ones of the failover policies described above. For example, possible failover nodes may be examined according to the best fit failover policy, but before applications are actually failed over an additional step is performed to see if the selected failover node is disqualified during that particular time of day. Alternatively, all excluded failover nodes may be determined first, implementing a best fit policy among the remaining nodes. Further, as described above, if it is also determined what time of day particular applications on a node are heavily used, at the time failure occurs the failed node may also be examined to determine if applications running on it are designated as heavily used during that time period. If so, that application(s) may be failed over first. Accordingly, by considering the time(s) of day during which nodes and/or applications running on nodes are heavily utilized, failover policies can be made more effective, improving the overall high availability of the system.

Many of the above failover policies have been described as having all applications running on a failed node failover to a single surviving node. Often times, however, it will be desirable to have different applications failover to different nodes. For example, it may be desirable to have a critical application running on a failed node failover to a surviving node having the most available resources (lowest weight), and other applications running on that node failover to a designated single node. Such a scheme may help to ensure that the most important application(s) running on a node are failed over in a manner that is most likely to ensure minimal interruption. Any one of the above failover policies may be implemented for any application running on a node. A system administrator would determine which failover policy to use for which application at the time the system is established, or at the time the node is added to the cluster.

Although the present invention has been described in detail, it should be understood that various changes, substitutions and alterations can be made hereto without departing from the spirit and scope of the invention as defined by the appended claims.

What is claimed is:

1. A failover method for a computer system having at least three nodes operating as a cluster, said method comprising the steps of:
   detecting a failure of one of the nodes;
   determining a time of failure of the failed node;
   for a second node in the cluster, determining a time period during which the second node is heavily utilized;
   preventing the second node from being assigned as a failover node during the time period during which it is heavily utilized;
   assigning a failover node, other than the second node, taking into consideration the determined time of failure of the failed node; and
   assigning applications running on the failed node to the failover node.

2. The failover method according to claim 1, further comprising the steps of:
   for at least the failed node, determining in advance of failure a time during which at least one application running on the failed node is heavily utilized; and
   following the failure of the failed node, if failure occurs during the determined time period, then assigning a failover node for the at least one application before assigning a failover node for any of the other applications of the failed node.

3. A cluster computer system, comprising:
   at least three nodes, wherein the nodes are computer systems operating as a cluster, wherein the cluster computer system is capable of determining a time of failure of one of the nodes, and implementing a failover policy in which, following a failure of the failed node, a failover node is selected based in part on the determined time, and wherein the cluster computer system is capable of identifying a time period which at least one of the nodes is heavily utilized, preventing the heavy utilized node from being assigned as a failover node during the identified time period, assigning a failover node, other than the heavily utilized node, taking into consideration the determined time of failure of the failed node and assigning applications running on the failed node to the failover node.

4. The cluster computer system of claim 3, wherein the cluster computer system is further capable of determining a time period during which at least one application on the failed node is heavily utilized, and upon failure of the failed node, if the failure occurs during the determined time, then failing over the at least one application before failing over any of the other applications of the failed node.

5. A failover method for a computer system having at least three nodes operating as a cluster, the method comprising the steps of:

determining a time period during which each of the nodes is heavily utilized;

detecting a failure of one of the nodes;

determining a time of failure of the failed node; preventing failover of applications running on the failed node to a second node if the failure of the failed node occurs during a time period in which the second node is heavily utilized;

assigning a failover node, other than the second node, taking into consideration the determined time of failure of the failed node; and assigning applications running on the failed node to the failover node.

* * * * *